United States Patent
Bogoni et al.

(10) Patent No.: US 7,526,115 B2
(45) Date of Patent: Apr. 28, 2009

(54) SYSTEM AND METHOD FOR TOBOGGAN BASED OBJECT SEGMENTATION USING DIVERGENT GRADIENT FIELD RESPONSE IN IMAGES

(75) Inventors: Luca Bogoni, Philadelphia, PA (US); Jianming Liang, Paoli, PA (US); Senthil Periaswamy, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 801 days.

(21) Appl. No.: 11/062,411

(22) Filed: Feb. 22, 2005

(65) Prior Publication Data

US 2005/0185838 A1    Aug. 25, 2005

Related U.S. Application Data

(60) Provisional application No. 60/547,002, filed on Feb. 23, 2004.

(51) Int. Cl.
    G06K 9/00 (2006.01)
(52) U.S. Cl. .................................... 382/131; 382/173
(58) Field of Classification Search ................ 382/128, 382/131, 173, 224, 225
    See application file for complete search history.

(56) References Cited

U.S. PATENT DOCUMENTS

| | | | |
|---|---|---|---|
| 5,608,812 A | 3/1997 | Shimura et al. | |
| 6,125,215 A | 9/2000 | Takeo et al. | |
| 2002/0164060 A1* | 11/2002 | Paik et al. | 382/128 |
| 2003/0223627 A1* | 12/2003 | Yoshida et al. | 382/128 |

FOREIGN PATENT DOCUMENTS

| WO | 01/39123 A1 | 2/2001 |
|---|---|---|
| WO | WO 03/034176 | 4/2003 |

OTHER PUBLICATIONS

Mortensen, Eric et al., Toboggan-Based Intelligent Scissors with a Four Parameter Edge Model, IEEE Computer Society Conference on Computer Vision and Pattern Recognition, 1999, vol. 2, pp. 452-458.*

Mortensen E. N. et al., "Tobaggan-Based Intelligent Scissors With A Four-Parameter Edge Model", *IEEE Intl. Conf. Computer Vision and Pattern Recognition.* vol. 2, Jun. 23, 1999, pp. 452-458.

(Continued)

*Primary Examiner*—Andrew W Johns

(57) ABSTRACT

A method and device for segmenting one or more candidates in an image having image elements is disclosed. The method includes identifying a location for one of the candidates in the image, where the location is based at a given image element, and computing one or more response values at neighboring image elements that are in a neighborhood of the location. Image element clusters are created from the computed response values and one or more of the image element clusters are selected as object segmentations for one or more of the candidates.

37 Claims, 17 Drawing Sheets

OTHER PUBLICATIONS

Kobatake H. et al., "Automatic Detection of Malignant Tumors on Mammogram", *Proceedings of the International Conference on Image Processing (ICIP)*, vol. 3, Conf. 1, Nov. 13, 1994, pp. 407-410.

Fairfield J. Ed, "Toboggan Contrast Enhancement for Contrast Segmentation", *Proceedings of International Conference on Pattern Recognition*, vol. 1, Conf. 10, Jun. 16, 1990, pp. 712-716.

Mortensen E. et al., "Adaptive Boundary Detection Using 'live-wire' Two-Dimensional Dynamic Programming", *Computers in Cardiology 1992*, Oct. 11, 1992, pp. 635-638.

International Search Report including Notification of Transmittal of the International Search Report, International Search Report, and Written Opinion of the International Searching Authority.

* cited by examiner

SYSTEM AND METHOD FOR TOBOGGAN BASED OBJECT SEGMENTATION USING DIVERGENT GRADIENT FIELD RESPONSE IN IMAGES

CROSS-REFERENCE TO RELATED APPLICATION

This application claims the benefit of U.S. Provisional Application No. 60/547,002 filed on Feb. 23, 2004, titled as "Toboggan Based Object Segmentation Using Divergent Gradient Field Response In Images", entire contents of which are incorporated herein by reference.

TECHNICAL FIELD

The present invention generally relates to the analysis of multi-dimensional images and more particularly to using Tobogganing and Divergent Gradient Field Response (DGFR) in 3-D image analysis.

DISCUSSION OF THE RELATED ART

The field of medical imaging has seen significant advances since the time X-Rays were first used to determine anatomical abnormalities. Medical imaging hardware has progressed in the form of newer machines such as Medical Resonance Imaging (MRI) scanners, Computed Axial Tomography (CAT) scanners, etc. Because of large amount of image data generated by such modern medical scanners, there is a need for developing image processing techniques that automatically determine the presence of anatomical abnormalities in scanned medical images.

Recognizing anatomical structures within digitized medical images presents multiple challenges. First concern is related to the accuracy of recognition. Another concern is the speed of recognition. Because medical images are an aid for a doctor to diagnose a disease or condition, the speed of recognition is of utmost importance to aid the doctor in reaching an early diagnosis. Hence, there is a need for improving recognition techniques that provide accurate and fast recognition of anatomical structures in medical images.

Digital medical images are constructed using raw image data obtained from a scanner, for example, a CAT scanner, MRI, etc. Digital medical images are typically either 2-D images made of pixel elements or 3-D images made of volume elements ("voxels"). Such 2-D or 3-D images are processed using medical image recognition techniques to determine presence of anatomical structures such as cysts, tumors, polyps, etc. However, given the amount of image data generated by any given image scan, it is preferable that an automatic technique should point out anatomical features in the selected regions of an image to a doctor for further diagnosis of any disease or condition.

Feature based recognition techniques are used to determine presence of anatomical structures in medical images. However, feature based recognition techniques suffer from accuracy problems. Hence, there is a need for non-feature based recognition techniques that provide improved recognition of anatomical features in medical images.

Medical image analysis techniques that use tobogganing, DGFR, etc., provide improved image analysis. But the advantages obtained by using such techniques can be further enhanced if a combination of such techniques is used. Hence, there is a need to determine combinations of image analysis techniques that can provide improved results as compared to conventional image analysis techniques.

Use of DGFR techniques for medical image analysis is disclosed in U.S. patent application titled "A SYSTEM AND METHOD FOR FILTERING AND AUTOMATIC DETECTION OF CANDIDATE ANATOMICAL STRUCTURES IN MEDICAL IMAGES" by Senthil Periaswamy and Luca Bogoni, which was filed on Nov. 10, 2004, and has the Ser. No. 10/985,548, the entire contents of which are incorporated herein by reference.

Use of Tobogganing techniques for medical image analysis is disclosed in U.S. patent application titled "TOBOGGAN BASED SHAPE CHARECTERIZATION" by Luca Bogoni and Jianming Liang, which was filed on Dec. 7, 2004 and has the Ser. No. 11/006,282, the entire contents of which are incorporated herein by reference.

SUMMARY

One aspect of the invention involves a method and device for segmenting one or more candidates in an image having image elements. The method includes identifying a location for one of the candidates in the image, where the location is based at a given image element, and computing one or more response values at neighboring image elements that are in a neighborhood of the location. Image element clusters are created from the computed response values and one or more of the image element clusters are selected as object segmentations for one or more of the candidates.

Another object of the invention involves a method for analyzing candidate objects in an image by extracting a sub-image volume from the image, where the sub-image volume includes image elements, and tobogganing using the image elements to generate one or more tobogganed clusters. The tobogganed clusters are integrated to determine at least one tobogganed cluster corresponding to one of the candidate objects as a final tobogganed cluster, and the sub-image volume is segmented using the final tobogganed cluster to analyze the one of the candidate objects.

BRIEF DESCRIPTION OF DRAWINGS

Exemplary embodiments of the present invention are described with reference to the accompanying drawings, of which.

DETAILED DESCRIPTION OF THE EXEMPLARY EMBODIMENTS

The exemplary embodiments of the present invention will be described with reference to the appended drawings.

Figure 1:
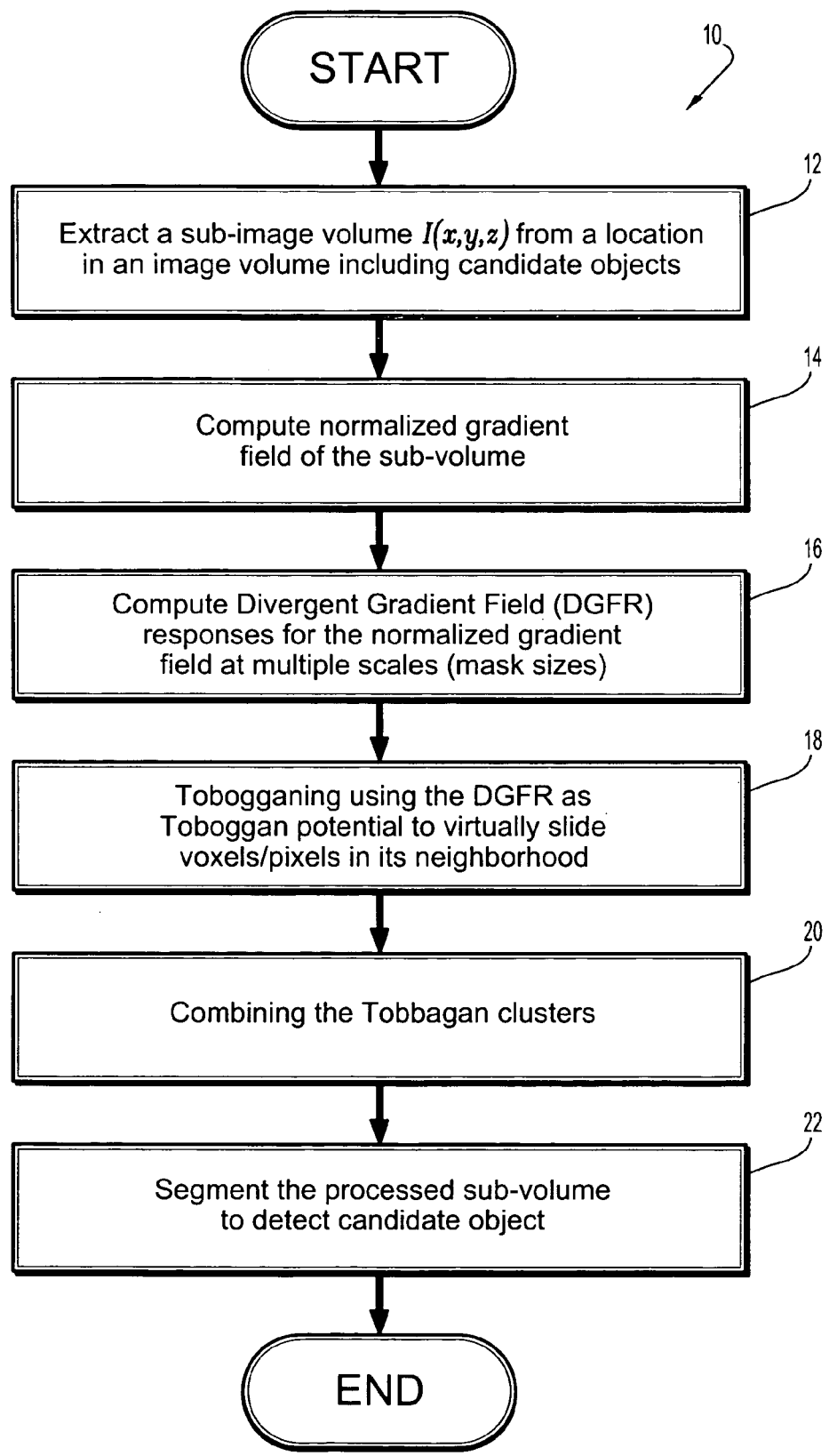
FIG. 1 is a flowchart showing candidate object detection using DGFR and Tobogganing in an embodiment of the invention.

FIG. 1 is a flowchart showing candidate object detection using DGFR and Tobogganing in an embodiment of the invention. Flowchart 10 starts at a step 12 where a sub-image volume I(x, y, z) is extracted from a location in a raw image volume. The sub-volume can be either isotropic or anisotropic. The sub-image volume broadly covers the candidate object(s) whose presence within the image volume needs to be detected. The original sub-volume is described in the context of FIG. 2 below. Toboggan-Based Object Segmentation (TBOS) using Divergent Gradient Field Response (DGFR) (hereafter referred to as TBOS-DGFR) assumes that the candidate object of interest has been located within an image volume using a manual or an automatic procedure. The region around the located image is the sub-volume and the nature of the candidate object needs to be determined.

Figure 2:
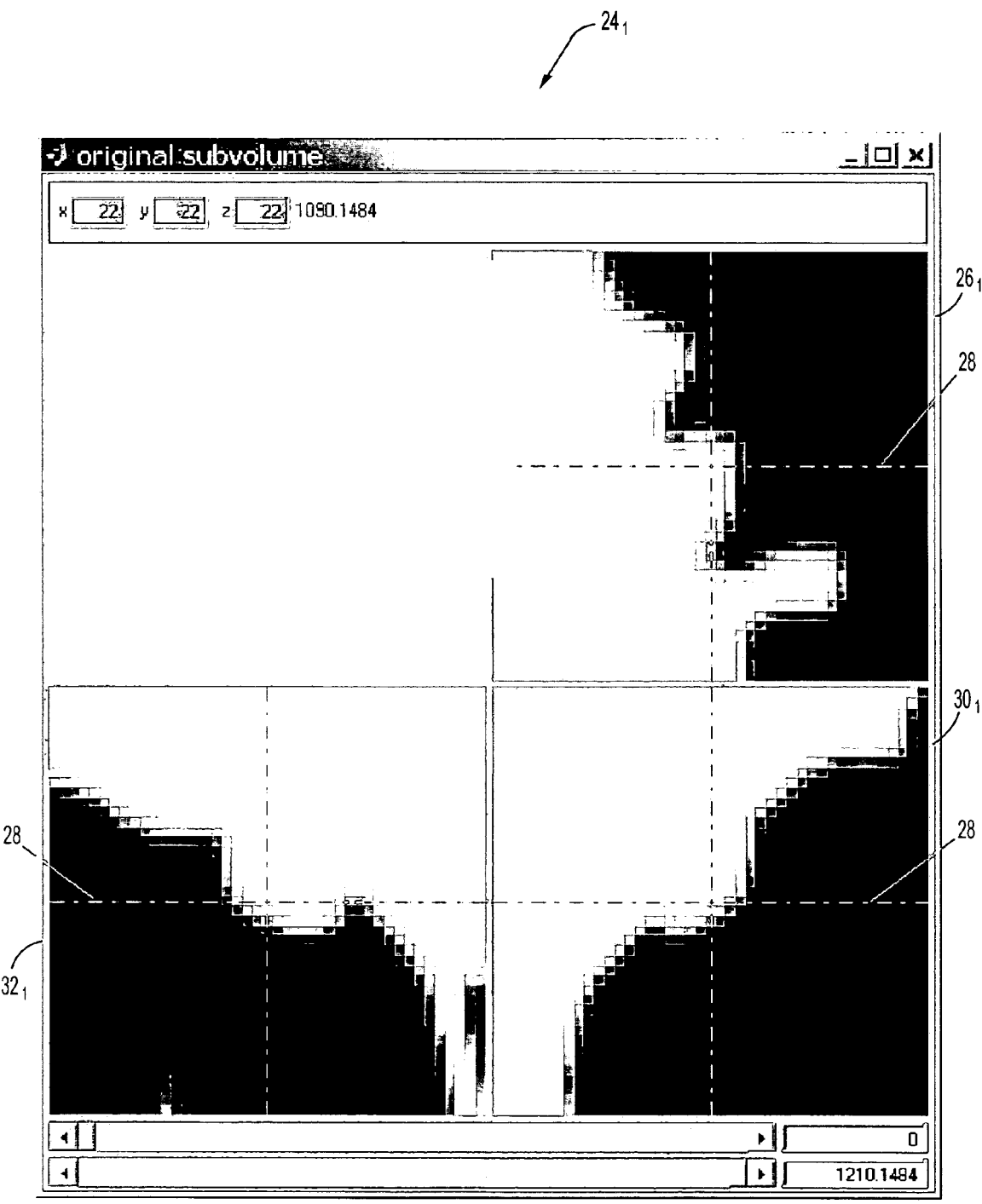
FIG. 2 shows 3D orthogonal views of an exemplary polyp in an illustrative sub-volume in an exemplary embodiment of the invention.

FIG. 2 shows 3D orthogonal views of an exemplary polyp in an illustrative sub-volume in an exemplary embodiment of the invention. As an illustration a polyp in a colon is considered as a candidate object in the process of virtual colonoscopy used to detect colon cancer. Those skilled in the art will appreciate that the exemplary polyp is only an illustration and any other candidate object—in medical images or in non-medical images—can be detected. Images from different modalities with any number of dimensions can be processed to detect candidate objects if a gradient field can be computed and tobogganing can be performed on them. Here, I(x, y, z) is a sub-volume having raw intensity image and contains an instance of the polyp.

The sub-volume I(x, y, z) can be determined by a user by clicking the polyp candidate displayed on a screen using a mouse or other similar pointing device (not shown). Alternatively, the candidate location can be automatically located by a detection module. For such automated polyp measurement, it is necessary to perform polyp segmentation. The process of polyp segmentation presents a challenge of determining an interpolating surface (plane or higher order surface) which separates the polyp from the colon wall.

When a mask size is compatible with the size of the given polyp, the DGFR technique generates an optimal response. However, the size of the polyp is typically unknown before it has been segmented and measured. Hence, DGFR responses need to be computed for multiple mask sizes which results in DGFR responses at multiple scales, where different mask sizes provide the basis for multiples scales.

Axial views window 241 shows orthogonal views of the exemplary polyp in the image sub-volume I(x, y, z). Axial view 26$_1$ shows a XZ axial plane view showing the polyp in the original image sub-volume. A cross-hair 28 is positioned to indicate the polyp's presence and location in the sub-volume. Axial view 30$_1$ shows a XY plane view of the polyp. Axial view 32$_1$ shows a YZ plane view of the polyp.

Referring back to FIG. 1, at a step 14, a normalized gradient field of the sub-volume is calculated for further calculations. A normalized gradient field represents the direction of the gradient. A normalized gradient field is estimated by dividing the gradient field by its magnitude. A normalized gradient field needs to be calculated so as to be independent of intensities in the original image. A normalized gradient field illustration is described in context of FIG. 3 below.

Figure 3:
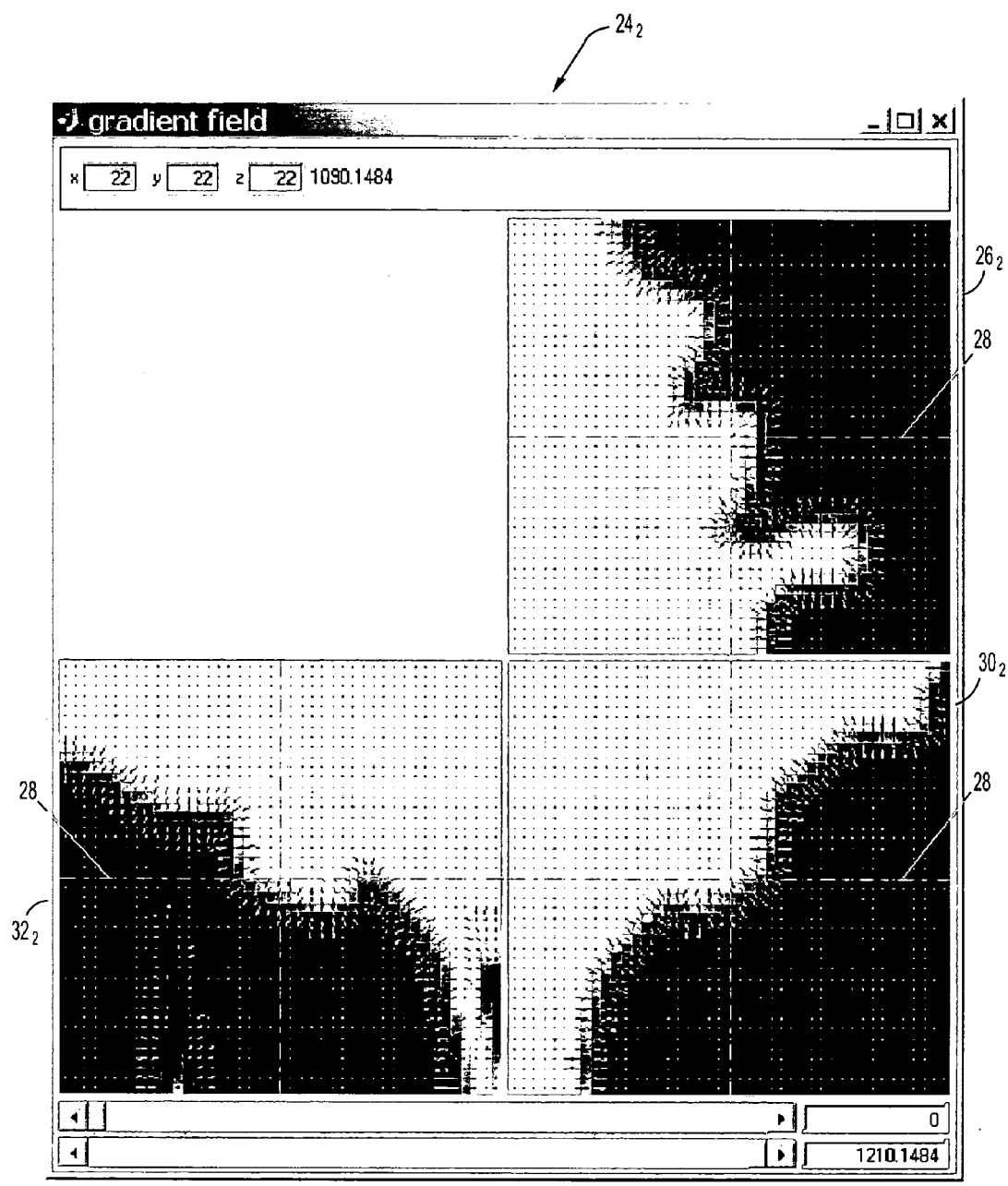
FIG. 3 shows a normalized gradient field for an exemplary polyp in an exemplary embodiment of the invention.

FIG. 3 shows a normalized gradient field for an exemplary polyp in an exemplary embodiment of the invention. Axial views window 24$_2$ shows orthogonal views of a normalized gradient field for the exemplary polyp in the image sub-volume I(x, y, z). The shown gradient field is computed from the image sub-volume I(x, y, z). Axial view 26$_2$ shows a XZ axial plane view of normalized gradient field for the polyp in the original image sub-volume. A cross-hair 28 is positioned to indicate the polyp's presence and location in the sub-volume. Axial view 30$_2$ shows a XY plane view of the normalized gradient field for the polyp. Axial view 32$_2$ shows a YZ plane view of normalized gradient field for the polyp. The normalized gradient field is represented by: ($I_x$(x, y, z), $I_y$(x, y, z), $I_z$(x, y, z)), and is depicted as small arrows in FIG. 3.

Referring back to FIG. 1, at a step 16, the computed normalized gradient field is used to calculate DGFR (divergent Gradient Field Response) responses for the normalized gradient field at multiple scales. DGFR response DGFR(x, y, z) is defined as a convolution of the gradient field ($I_x$, $I_y$, $I_z$) with a template vector mask of size S. The template vector field mask is discussed below next in context of FIG. 4. The convolution expressed in an equation form is listed below:

$$DGFR(x, y, z) = \sum_{k \in \Omega}\sum_{j \in \Omega}\sum_{i \in \Omega} M_x(i, j, k)I_x(x-i, y-j, z-k) + \qquad (1)$$
$$\sum_{k \in \Omega}\sum_{j \in \Omega}\sum_{i \in \Omega} M_y(i, j, k)I_y(x-i, y-j, z-k) +$$
$$\sum_{k \in \Omega}\sum_{j \in \Omega}\sum_{i \in \Omega} M_z(i, j, k)I_z(x-i, y-j, z-k)$$

where the template vector field mask M($M_x$(x, y, z), $M_y$(x, y, z), $M_z$(x, y, z)) of mask size S is defined as:

$$M_x(i,j,k) = i/\sqrt{(i^2+j^2+k^2)} \qquad (2)$$

$$M_y(i,j,k) = j/\sqrt{(i^2+j^2+k^2)} \qquad (3)$$

$$M_z(i,j,k) = k/\sqrt{(i^2+j^2+k^2)} \qquad (4)$$

with $\Omega = [-\text{floor}(s/2), \text{floor}(S/2)]$.

The convolution above is a vector convolution. While the defined mask M may not be considered from one viewpoint as separable, but it can be approximated with single value decomposition and hence a fast implementation of the convolution is achievable.

DGFR is both an approach for filtering, in its simplest form and a sophisticated algorithm to perform automatic detection of candidate anatomical structures. For example, DGFR can be used to perform automatic detection of colonic polyps for colon cancer detection, aneurisms, lung nodules for lung cancer detection, etc. DGFR can also be used to obtain other descriptive characteristics of a candidate lesion useful for its identification and classification. The DGFR technique is described next. Let I(x, y, z) be a raw intensity image volume containing a polyp instance of which three axial views are shown in FIG. 3.

Figure 4:
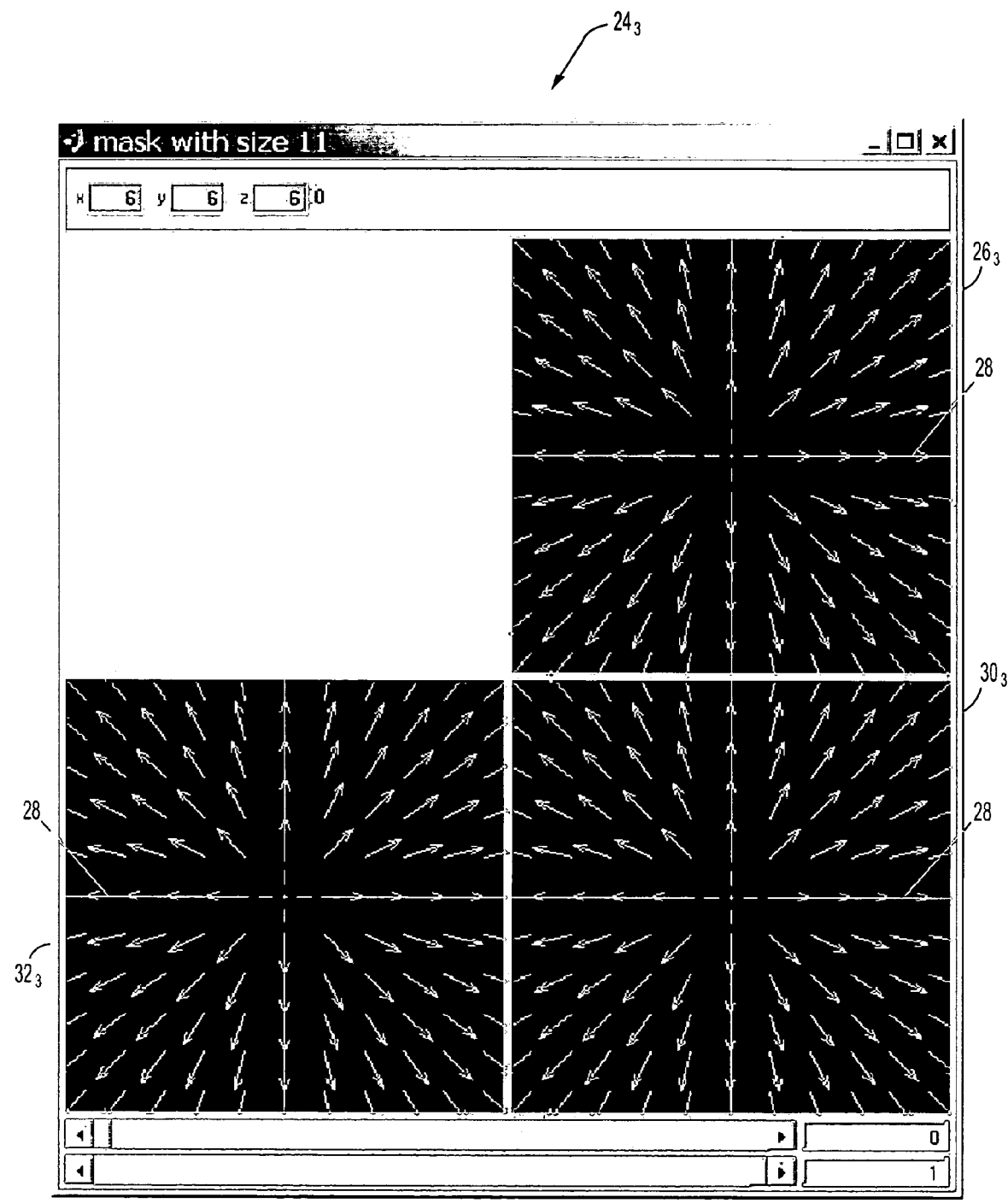
FIG. 4 shows an exemplary template vector mask of size 11 in an exemplary embodiment of the invention.

FIG. 4 shows an exemplary template vector mask of size 11 in an exemplary embodiment of the invention. An exemplary three dimensional vector mask of size 11 is shown with views along its axes. Axial views window 243 shows orthogonal views of a vector mask of size 11. Axial view $26_3$ shows a XZ axial plane view of the mask. A cross-hair 28 is positioned to indicate the polyp's presence and location in the sub-volume. Axial view $30_3$ shows a XY plane view of the vector mask. Axial view $32_3$ shows a YZ plane view of the vector mask.

A template vector mask includes the filter coefficients for the DGFR. The template vector mask is used to convolve with the gradient vector field to produce the gradient field response.

Application of masks of different dimensions, i.e., different convolution kernels, will yield DGFR image responses that emphasize underlying structures where the convolutions give the highest response. Hence, in the present illustration small spherical and semi-spherical structures will respond to masks of smaller dimensions, i.e., 5, 7 and 9; while larger structures will yield higher response to masks with larger dimensions, i.e., 21, 23 and 25. However, larger structures may also have high response with smaller masks due to the local symmetry of the structures. This aspect of locality of response by smaller masks is used in the discussion below to accrue/integrate high-frequency details of the segmented polyp.

FIGS. 5, 6, 7 and 8 show DGFR response images for masks sizes 11, 9, 7 and 5. Multiple mask sizes are required because the size of the polyp is unknown at this stage and hence it is necessary to generate multiple DGFR responses over multiple scales as per the different mask sizes.

Figure 5:
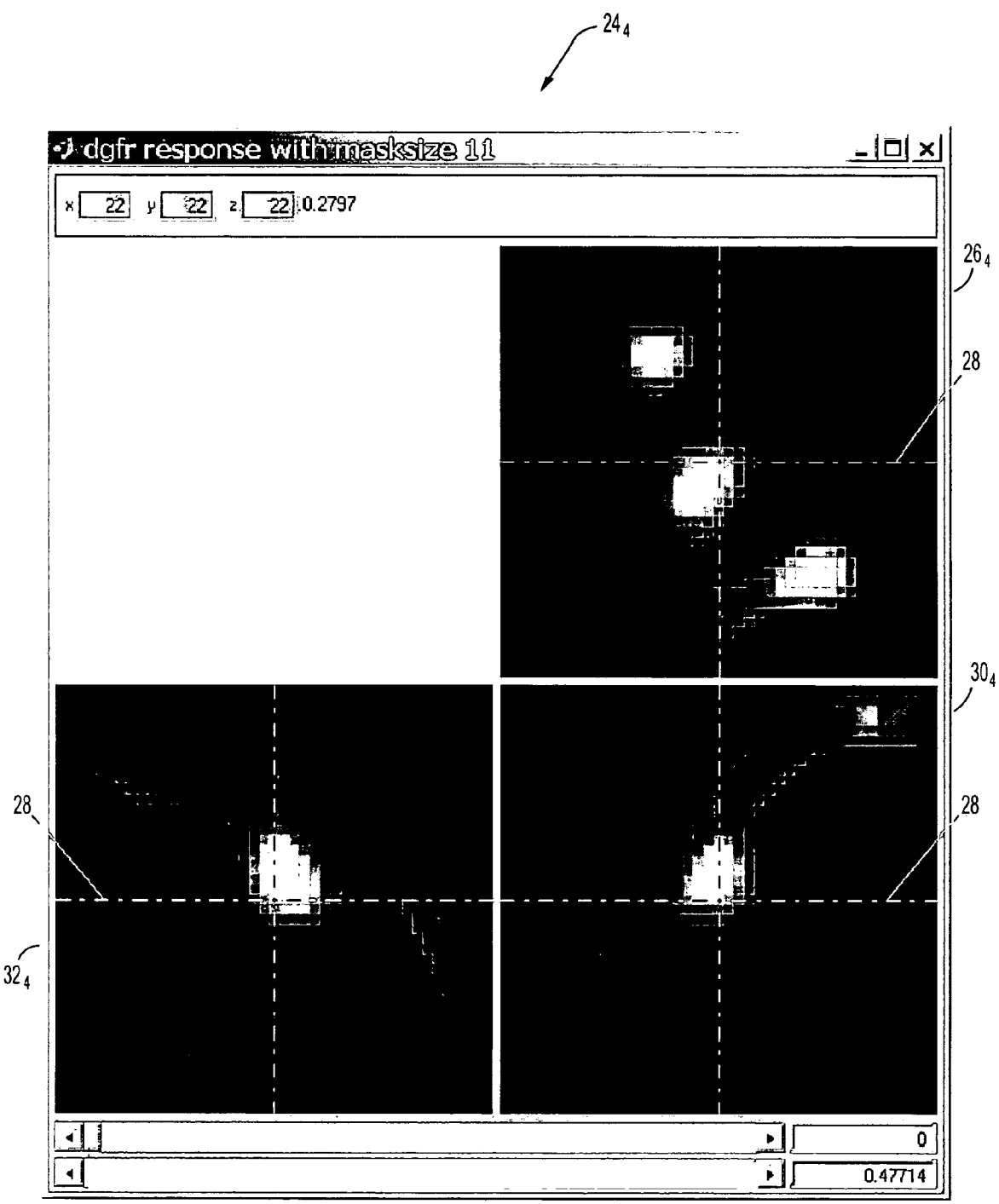
FIG. 5 shows a DGFR response image generated for the exemplary mask size 11 shown in FIG. 4 in an exemplary embodiment of the invention.

FIG. 5 shows a DGFR response image generated for the exemplary mask size 11 shown in FIG. 4 in an exemplary embodiment of the invention. Axial views window 244 shows orthogonal views of the DGFR response image generated using a vector mask of size 11. Axial view $26_4$ shows a XZ axial plane view of the DGFR response for mask size 11. The cross-hair 28 is positioned to indicate the polyp's presence and location in the sub-volume. Axial view $30_4$ shows a XY plane view of the DGFR response for mask size 11. Axial view $32_4$ shows a YZ plane view of the DGFR response for mask size 11. The DGFR response is generated through a vector convolution operation where a mask of size 11 (in this example) is applied to the normalized gradient field ($I_x(x, y, z)$, $I_y(x, y, z)$, $I_z(x, y, z)$) as shown in equations 1 to 4 above.

Figure 6:
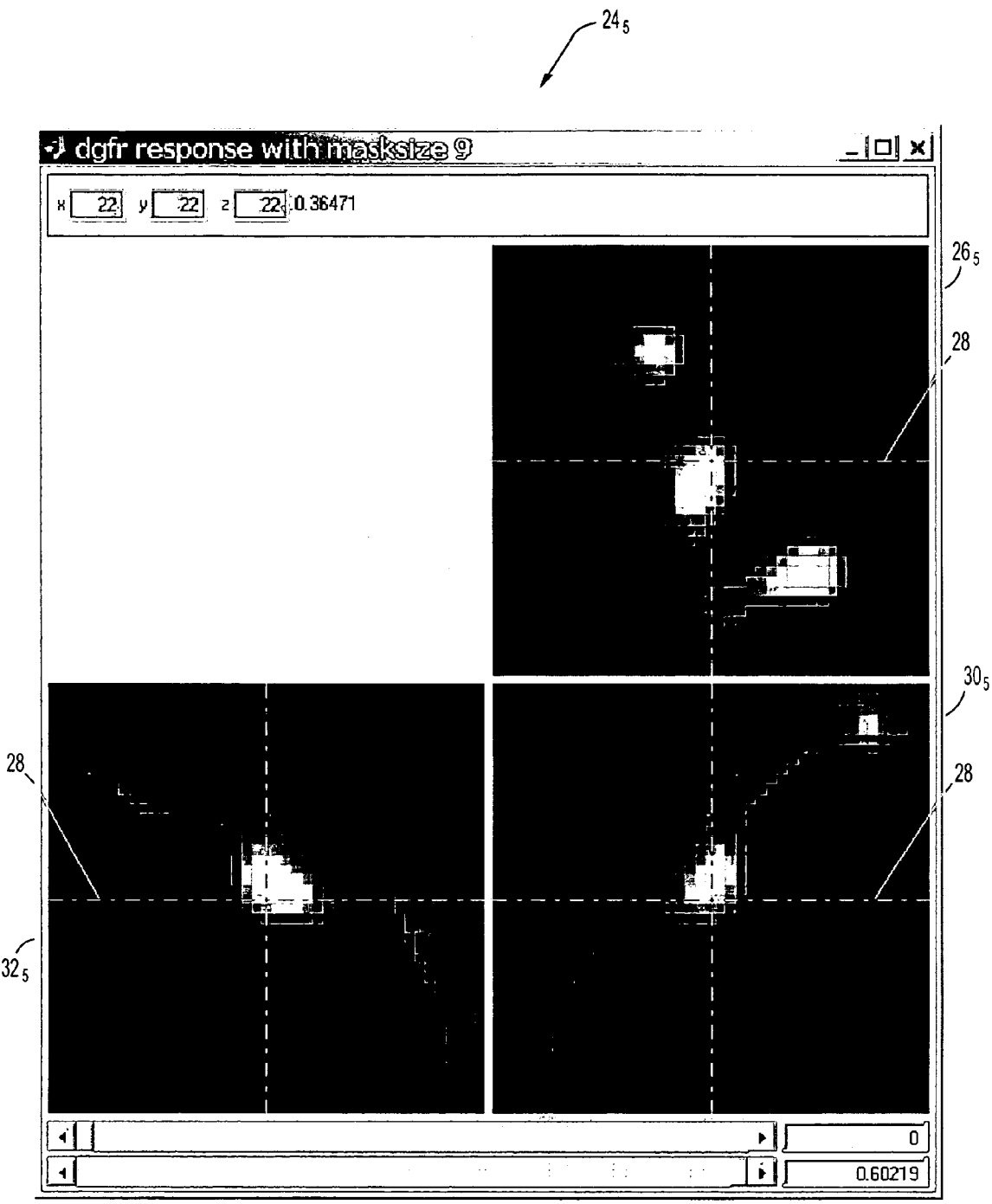
FIG. 6 shows a DGFR response image generated for an exemplary mask of size 9 in an exemplary embodiment of the invention.

FIG. 6 shows a DGFR response image generated for an exemplary mask of size 9 in an exemplary embodiment of the invention. Axial views window $24_5$ shows orthogonal views of the DGFR response image generated using a vector mask of size 9. Axial view $26_5$ shows a XZ axial plane view of the DGFR response for the mask size 9. A cross-hair 28 is positioned to indicate the polyp's presence and location in the sub-volume. Axial view $30_5$ shows a XY plane view of the DGFR response for the mask size 9. Axial view $32_5$ shows a YZ plane view of the DGFR response for the mask size 9.

Figure 7:
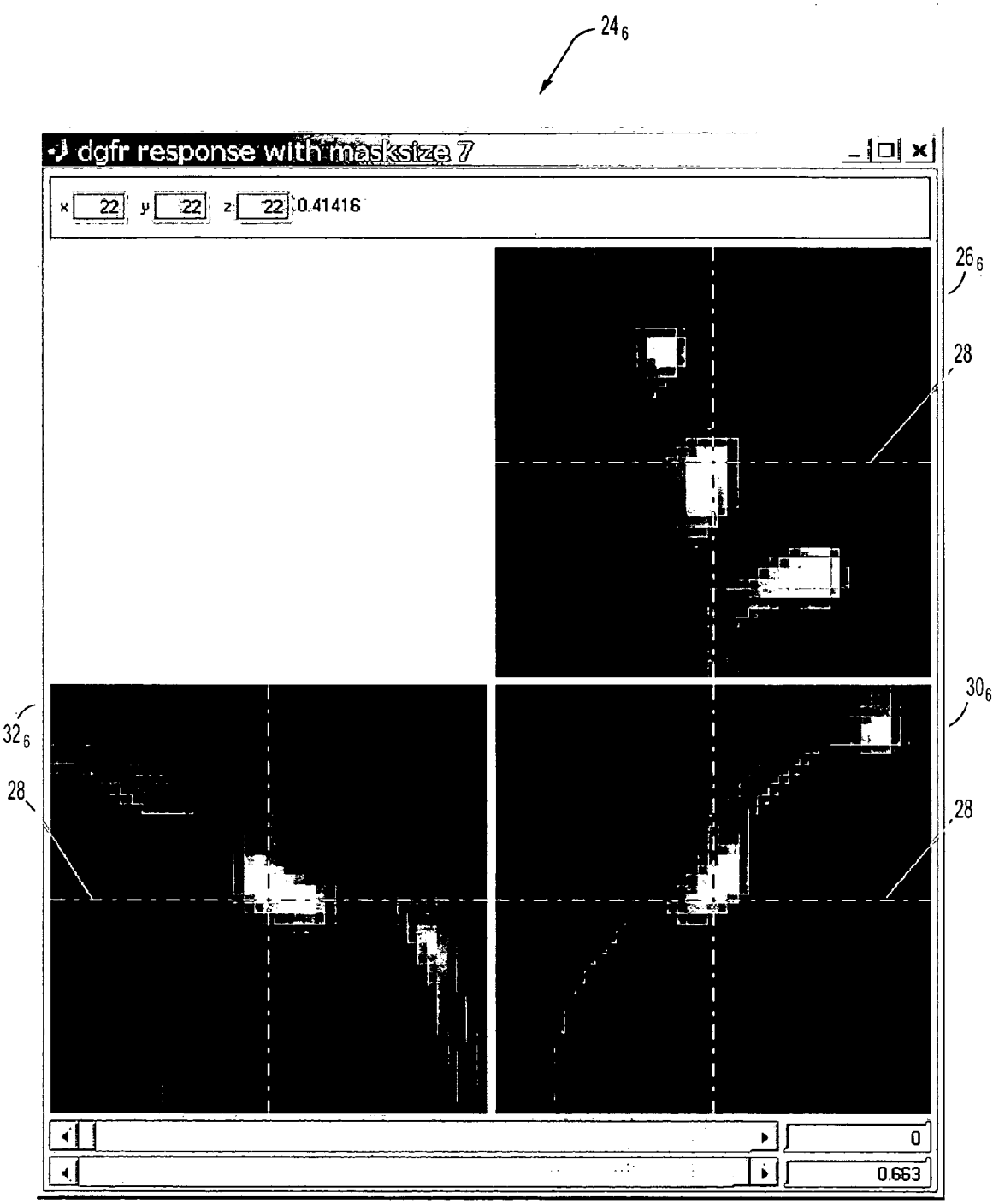
FIG. 7 shows a DGFR response image generated for an exemplary mask of size 7 in an exemplary embodiment of the invention.

FIG. 7 shows a DGFR response image generated for an exemplary mask of size 7 in an exemplary embodiment of the invention. Axial views window $24_6$ shows orthogonal views of the DGFR response image generated using a vector mask of size 7. Axial view $26_6$ shows a XZ axial plane view of the DGFR response for the mask size 7. A cross-hair 28 is positioned to indicate the polyp's presence and location in the sub-volume. Axial view $30_6$ shows a XY plane view of the DGFR response for the mask size 7. Axial view $32_6$ shows a YZ plane view of the DGFR response for the mask size 7.

Figure 8:
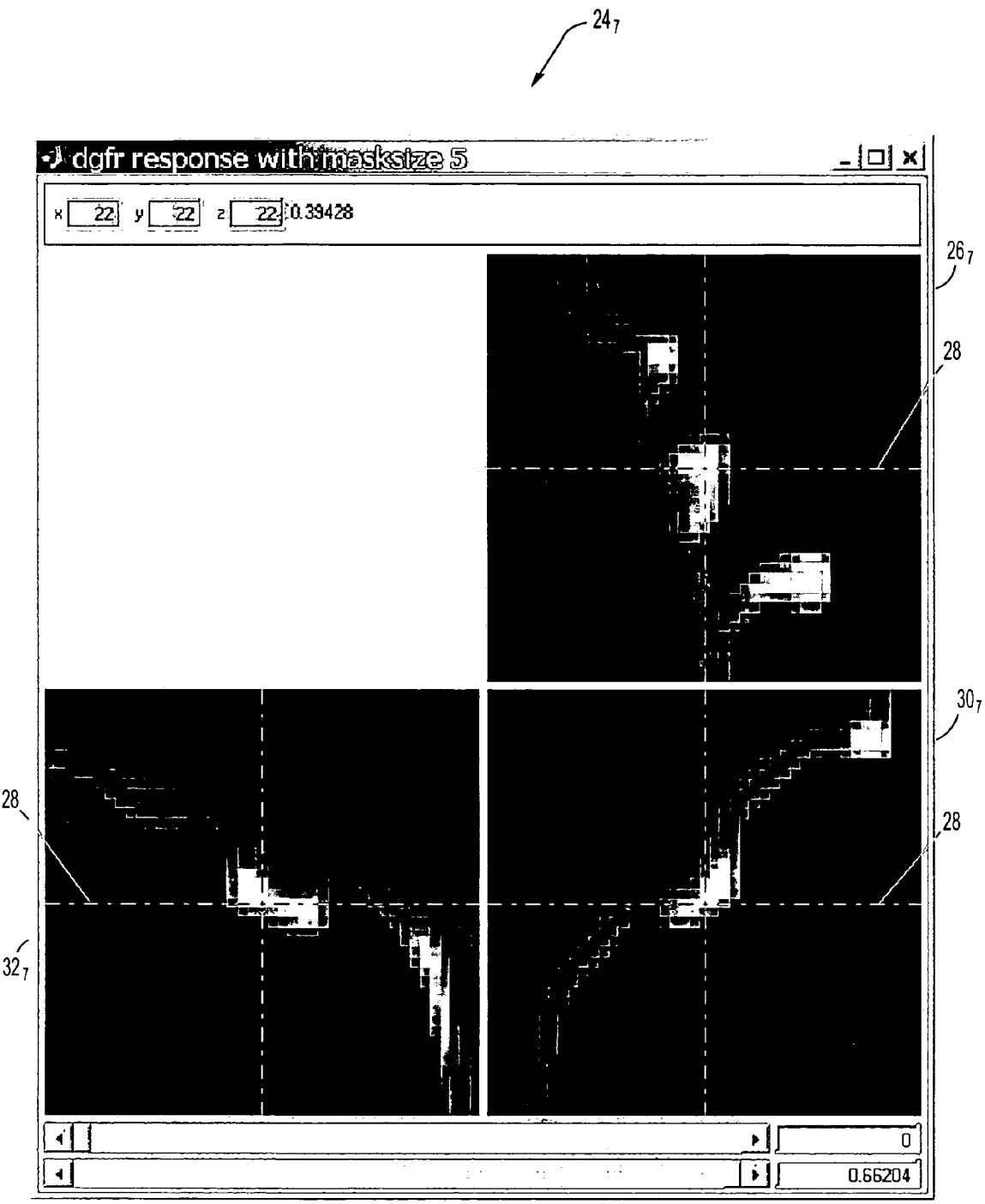
FIG. 8 shows a DGFR response image generated for an exemplary mask of size 5 in an exemplary embodiment of the invention.

FIG. 8 shows a DGFR response image generated for an exemplary mask of size 5 in an exemplary embodiment of the invention. Axial views window $24_7$ shows orthogonal views of the DGFR response image generated using a vector mask of size 5. Axial view $26_7$ shows a XZ axial plane view of the DGFR response for the mask size 5. A cross-hair 28 is positioned to indicate the polyp's presence and location in the sub-volume. Axial view $30_7$ shows a XY plane view of the DGFR response for the mask size 5. Axial view $32_7$ shows a YZ plane view of the DGFR response for the mask size 5.

Referring back to FIG. 1, at a step 18, tobogganing is performed using DGFR as Toboggan potential to virtually slide the image pixels or voxels in its neighborhood to form a cluster. Tobogganing is illustrated below using an example of an image sub-volume.

Figure 9:
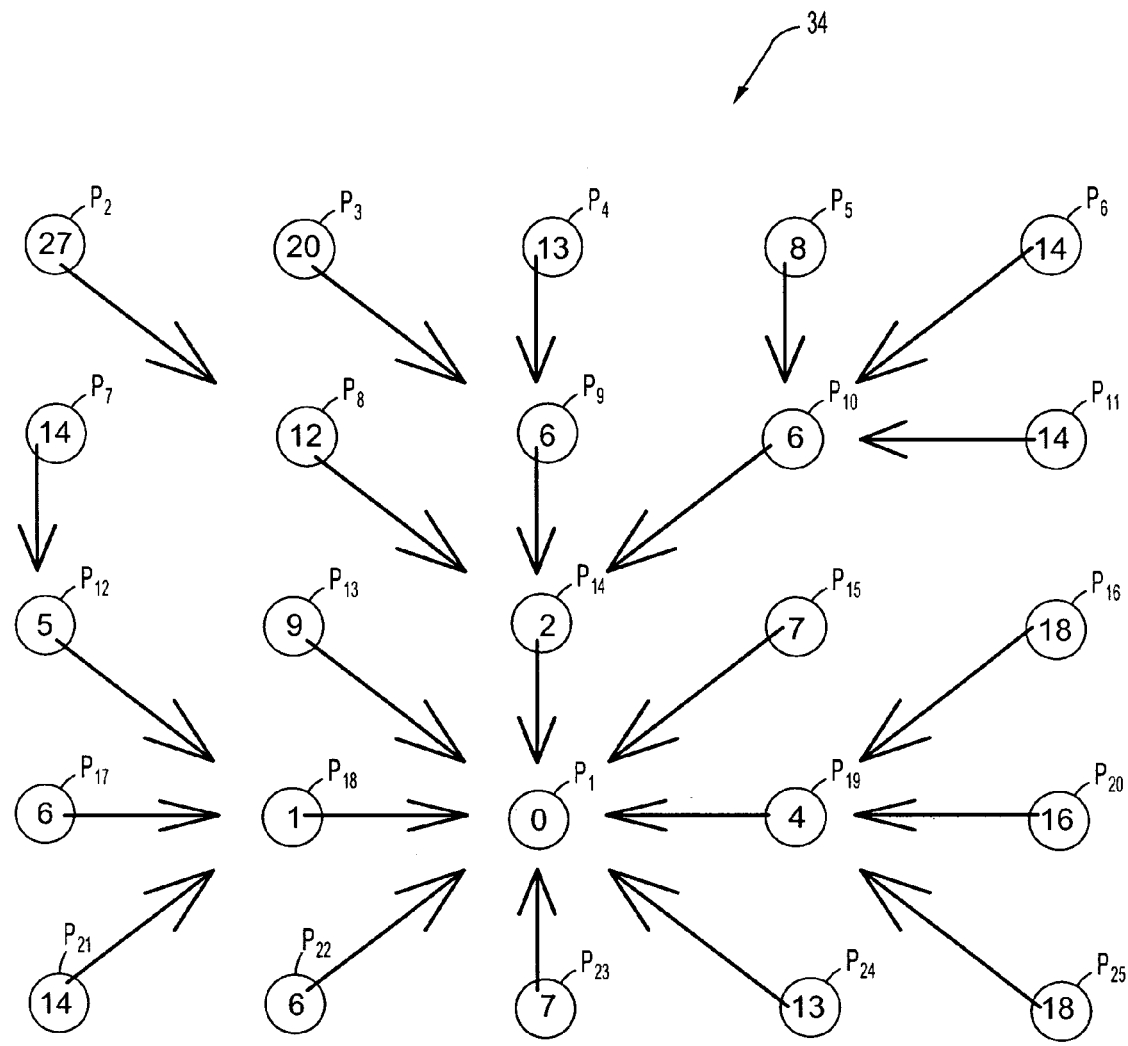
FIG. 9 illustrates the tobogganing technique in an exemplary embodiment of the invention.

FIG. 9 illustrates the tobogganing technique in an exemplary embodiment of the present invention. For illustration purposes a 2-dimensional image space is used to discuss tobogganing. Tobogganing is a non-iterative, single-parameter technique that operates in linear execution times. Tobogganing achieves linear execution times because it processes each image pixel/voxel only once. In at least one embodiment of the invention, a toboggan potential is computed from an original image volume, and it depends on the application and the objects to be segmented in the image. Hence, the toboggan potential is used to determine a slide direction at each pixel. In contrast, conventionally the sole input for tobogganing is the image's discontinuity or local contrast measure.

In at least one embodiment of the invention, a polyp is extracted using virtual colonoscopy. The response image for extracting the polyp is generated through the application of the DGFR from the original image volume. In the illustrative image section 34, all the pixels that slide to the same location are grouped together and thus partitioning the image volume into a collection of voxel clusters.

The image section 34 illustrates tobogganing process in a 5×5 toboggan potential in 2-D image space. The encircled numbers associated with arrows indicate potential values at each one of the pixels P1-P25. The potential values are generated by applying the DGFR (Divergent Gradient Field Response) to the image volume to generate a DGFR response. Each pixel "slides" to its neighbor with minimal potential. In the present illustration, all the pixels slide to the same location which called concentration location P1 having a potential of zero. This sliding of pixels to the concentration location forms a single cluster.

Sliding of pixels is determined by choosing a neighbor pixel with minimal potential. For example, the pixel P2 has a potential of 27, and its neighboring pixels P3, P8 and P7 have potentials of 20, 12 and 14 respectively. Because each pixel slides towards a neighboring pixel with a minimal potential, the P2 pixel slides towards the pixel P8 which has the minimum potential of 12 of the three neighboring pixels P3, P8 and P7.

Another illustration for pixel P4 is described next. Pixel P4 has pixels P3, P8, P9, P10 and P5 as neighbors with potentials of 20, 12, 6, 6 and 8 respectively. Pixel P9 and P10 are neighbors with a minimum potential of 6 among the other neighbors P3, P8 and P5 of the Pixel P4. Pixel P4 slides to the pixel P9 as per a predetermined selection criteria for a choice between neighbors having the same minimal potential.

Pixel P1 is has the minimum potential of zero and hence all its neighboring pixels P13, P14, P15, P19, P24, P23, P22 and P18 slide towards the Pixel P1 and hence form a single cluster which is a "concentration location". Thus, an image volume can be partitioned into a collection of voxel clusters.

In the process of tobogganing each voxel (in 3-D) and pixel (in 2-D) slides/climbs to one of its neighbors according to the computed potential. While the above example show that pixels slide to a neighbor with a minimum potential, however that is only an illustration and selection of a neighbor depend on the application and the computation of toboggan potential. For example, pixels can slide or climb to location with either maximum or minimum potential.

In at least one exemplary embodiment for polyp segmentation, when a DGFR response is used as the toboggan potential, a neighbor with maximum potential is selected where each voxel climbs to a neighbor with highest potential. If a given voxel has a higher potential than any of its neighbors it doesn't climb further and becomes a concentration location itself. This process generates the toboggan direction and the toboggan label for each voxel for a given DGFR response. All the voxels that climb to the same concentration location are associated with a unique cluster label and grouped into one toboggan cluster.

Figure 10:
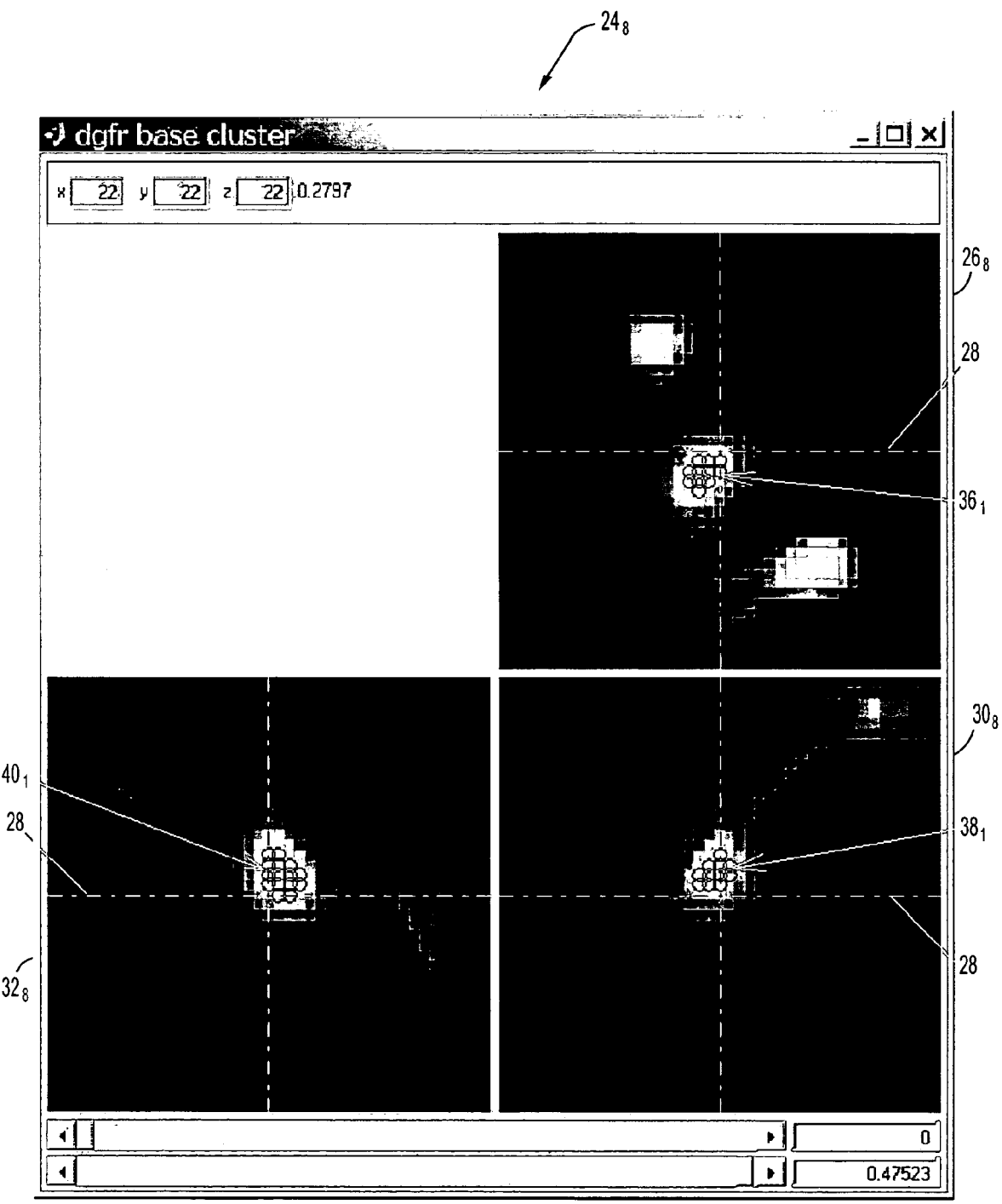
FIG. 10 shows a toboggan cluster formed over a DGFR response in an exemplary embodiment using a mask size of 11.

FIG. 10 shows a toboggan cluster formed over a DGFR response in an exemplary embodiment using a mask size of 11. The toboggan cluster is represented as small circles ($36_1$, $38_1$ and $40_1$) in an Axial views window $24_8$. The Axial views window $24_8$ shows orthogonal views of the toboggan cluster over the DGFR response image generated using a vector mask of size 11. Axial view $26_8$ shows an axial plane view of the toboggan cluster that includes an XZ toboggan cluster view $36_1$. A cross-hair 28 is positioned to indicate the polyp's presence and location in the sub-volume. Axial view $30_8$ shows an axial plane view of the toboggan cluster that includes a XY toboggan cluster view $38_1$. Axial view $32_8$ shows an axial plane view of the toboggan cluster that includes a YZ toboggan cluster view $40_1$.

Figure 11:
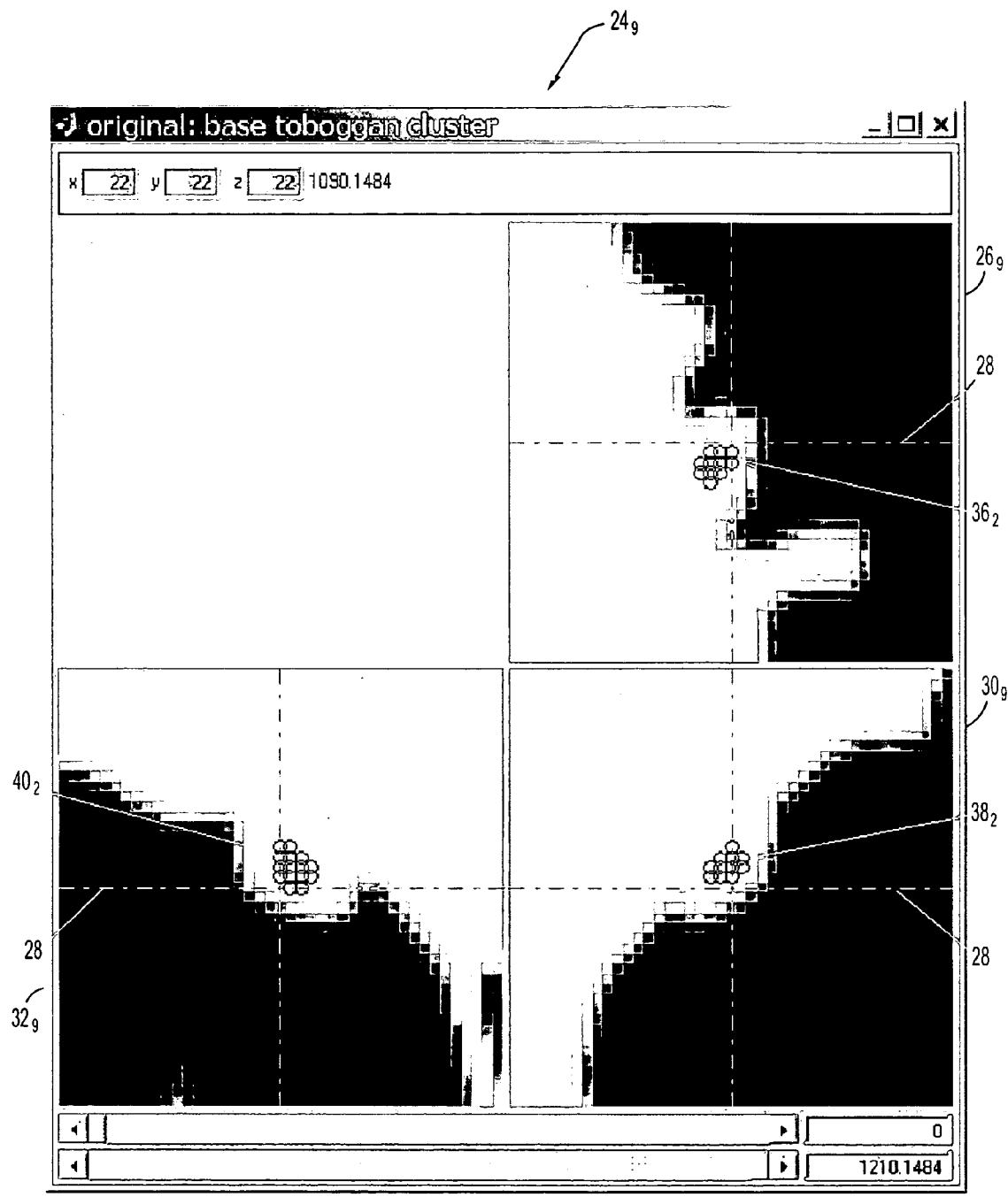
FIG. 11 shows a toboggan cluster formed over a sub-volume of the original image response in an exemplary embodiment using DGFR with a mask size of 11.

FIG. 11 shows a toboggan cluster formed over a sub-volume of the original image response in an exemplary embodiment using DGFR with a mask size of 11. The toboggan cluster is represented as small circles in an Axial views window $24_9$. The Axial views window $24_9$ shows orthogonal views of the toboggan cluster over the DGFR response image generated using a vector mask of size 11. Axial view $26_9$ shows an axial plane view of the toboggan cluster that includes an XZ toboggan cluster view $36_2$. A cross-hair 28 is positioned to indicate the polyp's presence and location in the sub-volume. Axial view $30_9$ shows an axial plane view of the toboggan cluster that includes a XY toboggan cluster view $38_2$. Axial view $32_9$ shows an axial plane view of the toboggan cluster that includes a YZ toboggan cluster view $40_2$.

Exemplary techniques for optimizing tobogganing process are discussed next. The tobogganing process may be applied to only a small region in certain applications, that is, it is not necessary for all the voxels to slide/climb in the sub-volume. For instance, in case of polyp segmentation, only the region along the colon wall is of interest and there is no need for the voxels representing the air or bone to climb/slide. Such voxels of secondary importance can be pre-thresholded out based on known intensity values and related Houndsfield Units (HU) associated with air and bone.

The DGFR responses can also be thresholded so that any voxel with lower response than chosen value is not processed. Hence, thresholding can better refine the areas to be processed and further it can remove unnecessary computation accelerating the tobogganing process. Tobogganing is performed at each scale and hence consequentially there may be toboggan clusters at each scale. However, by thresholding on intensity and on the DGFR response as described above, for some scale(s) there may be no resulting tobogganing clusters.

DGFR responses are considered next. The support for a DGFR response is proportional to the symmetry of the gradient field. That is, the more symmetric the gradient field, the larger is the response. A divergent field will give the highest response when the concentration point for the gradient field in coincident with the center of the mask capturing the response. Now, for an ideal polyp pedunculated (i.e., spherical in shape and connected to the colon wall via a stem) or sessile (i.e., hemispherical), the strongest gradient will concentrate in the center and its magnitude will be supported by the strong edge transition. A template mask whose size coincides with the diameter of such structure will yield the strongest response. This mask is called a "capturing mask".

The response from the DGFR depends in part on the symmetry of the polypoid structure and on the concentration point of the divergent field. When processing the same polypoid structure, masks that are larger than the capturing mask will have a field that is increasingly less aligned with the optimal one, and hence the response will decrease. Smaller masks will still have support and can have much higher response than the capturing mask. That can be understood, by envisioning a smaller mask sliding radially from the center to the border. In the limiting case, mask of size 5 in this case, for a sessile polyp for instance, for the support on the response generated by the mask will come from more than half of an hemisphere. Hence for smaller masks, although the gradient field might not be completely aligned, the overall response may be higher.

From the above observations and given the variability of the anatomy of the structures segmented, it is not necessary that a single toboggan cluster, representing perfect polyp segmentation, be formed. Therefore, there is a need to integrate the toboggan clusters formed with the DGFR responses at multiple scales for polyp segmentation.

As can be seen in FIGS. 10 and 11 the tobogganing cluster is clustered on the polyp region. By being "centered" at the polyp region the tobogganed area.

Referring back to FIG. 1, at a step 20, tobogganed clusters are combined together. The process of combining the toboggan clusters is explained below in context of FIG. 12.

At a step 22, the processed sub-volume is segmented to detect one or more candidate objects.

Figure 12:
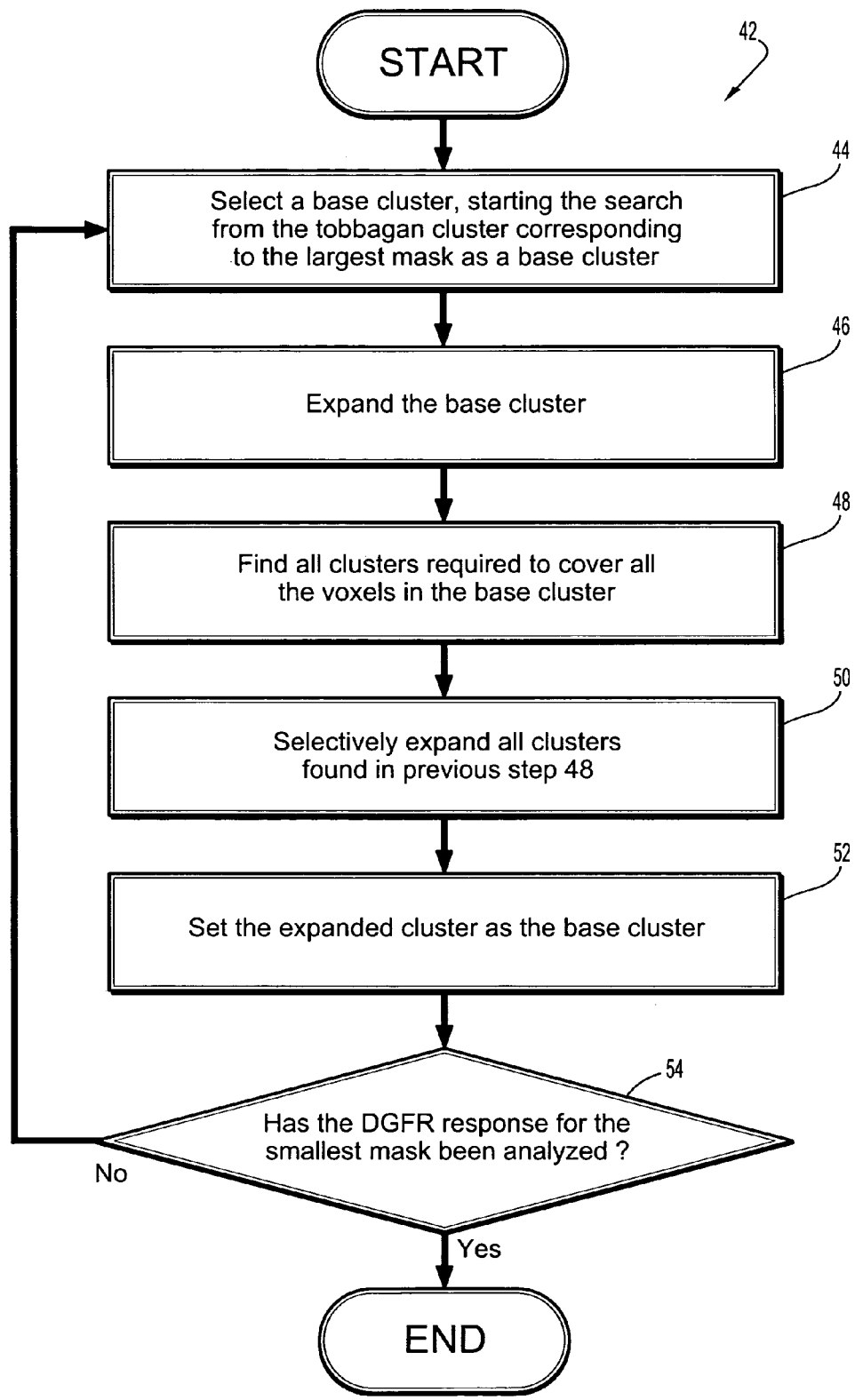
FIG. 12 shows a flowchart 42 for the process of integrating the toboggan clusters in an exemplary embodiment of the invention.

FIG. 12 shows a flowchart 42 for the process of integrating the toboggan clusters in an exemplary embodiment of the invention. The description of the integration process will refer to the example shown in FIGS. 9-11 and 13-16 (hereafter referred to as "the illustrated example"). At a step 44, an initial cluster is selected. As described above, toboggan clusters at multiple scales were obtained by application of masks of different sizes to the response image. Since a threshold is applied, there may not be any toboggan clusters for larger scales (i.e., for large masks). Therefore, an initial cluster needs to be determined. The search process starts from the largest mask available, and then the next larger mask is considered until a toboggan cluster that includes the detection location is found. This initial toboggan cluster is considered as a "base cluster".

In the illustrated example, if a threshold (0.3) is applied, no cluster is formed at the detection location based on the DGFR responses at scales from 23 to 13 (from top to bottom; from large to small); the initial cluster (i.e. base cluster) is found at scale of 11, shown in FIG. 10, where the base cluster is superimposed on the DGFR response, while the same cluster is superimposed on the original sub-volume in FIG. 10.

At step 46, the base cluster is expanded. The expansion of the base cluster is done by selectively including the voxels in the toboggan clusters which are generated based on the DGFR response at the next smaller mask. At step 48, all the clusters which are required to cover all the voxels in the base cluster are found.

At step 50, Iterative process for each cluster found in Step 48 is performed as described next. Assuming that the base cluster has B voxels, the new cluster in consideration for inclusion contains C voxels, and the total number of voxels in either the base cluster or the new cluster is D, p1 is defined as (B+C−D)/B and p2 as (B+C−D)/C. The base cluster is expanded by only including the voxels from the cluster if it stratifies the condition: (p1>InclusionThreshould1) and (p2>InclusionThreshould2). In the present illustrated example, InclusionThreshould1 was set to 0.6 and InclusionThreshould2 was set to 0.3 in exemplary implementation.

Figure 15:
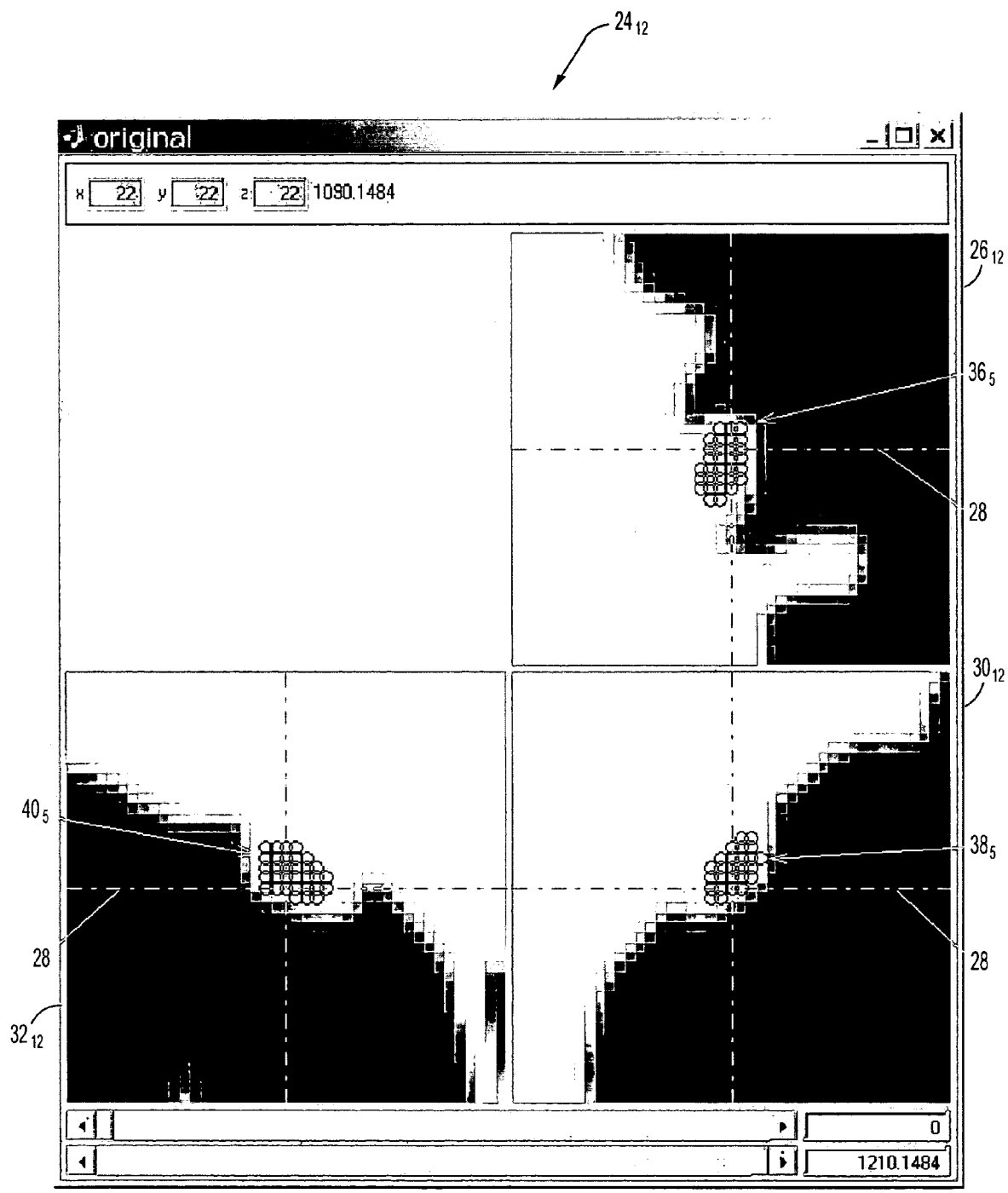
FIG. 15 shows the formed cluster after the integration process for clusters is performed in an exemplary embodiment of the invention.

At step 52, the expanded cluster is set as a base cluster. At step 54, the expansion process is iterated until the DGFR response at the smallest mask is reached. In present example, the smallest mask size is 5. The formed cluster is shown in FIG. 15.

Figure 13:
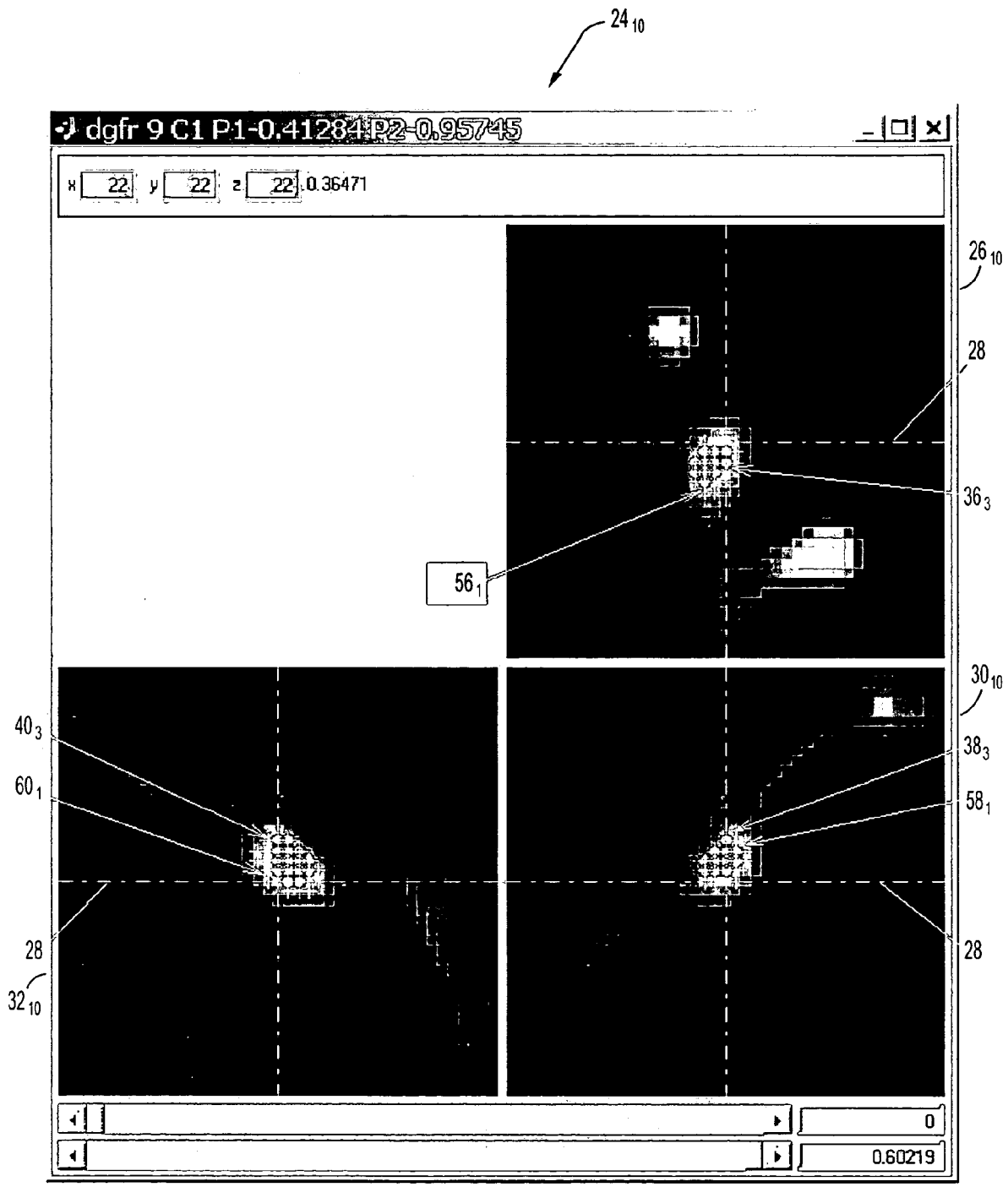
FIG. 13 shows axial views of toboggan clusters including an expanded toboggan cluster in an exemplary embodiment of the invention.
Figure 14:
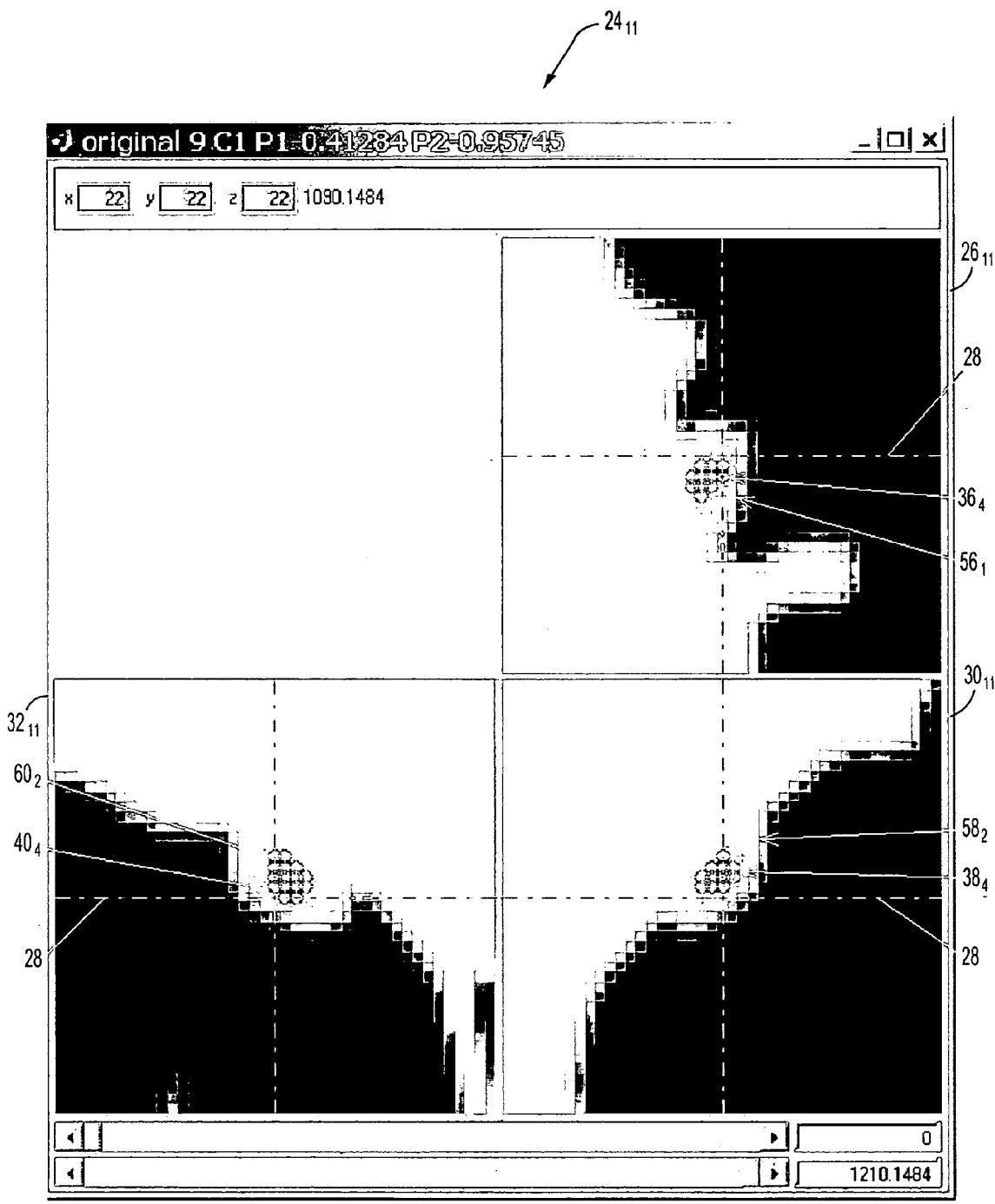
FIG. 14 shows axial views of toboggan clusters including an expanded toboggan cluster in an exemplary embodiment of the invention.

FIGS. 13 and 14 show axial views of toboggan clusters used in the cluster integration process described above in exemplary embodiments of the invention. In the illustrated example, there is only one cluster whose voxels are marked with "+" symbol in FIGS. 13 and 14 ($56_{1-2}$, $58_{1-2}$, $60_{1-2}$). This new expanded cluster covers all or at least a broad percentage of the voxels in the base cluster indicated with "o" in the FIGS. 13 and 14 ($36_{3-4}$, $38_{3-4}$, $40_{3-4}$). In general, it requires multiple clusters to cover all the voxels in the base cluster. If there are multiple clusters, to ensure the gradual expansion of the base cluster, each of the clusters is evaluated to verify that each satisfies the condition for inclusion described below.

FIG. 13 shows axial views of toboggan clusters including an expanded toboggan cluster in an exemplary embodiment of the invention. In FIG. 13, the toboggan cluster is represented as small circles in an Axial views window $24_{10}$. The Axial views window $24_{10}$ shows orthogonal views of the toboggan cluster. Axial view $26_{10}$ shows an axial plane view of the toboggan cluster that includes an XZ toboggan cluster view $36_3$ and a XZ expanded cluster view $56_1$. A cross-hair 28 is positioned to indicate the polyp's presence and location in the sub-volume. Axial view $30_{10}$ shows an axial plane view of the toboggan cluster that includes a XY toboggan cluster view $38_3$ and a XY expanded cluster view $58_1$. Axial view $32_{10}$ shows an axial plane view of the toboggan cluster that includes a YZ toboggan cluster view $40_3$ and a YZ expanded cluster view $60_1$.

FIG. 14 shows axial views of toboggan clusters including an expanded toboggan cluster in an exemplary embodiment of the invention. In FIG. 14, the toboggan cluster is represented as small circles in an Axial views window $24_{11}$. The Axial views window $24_{11}$ shows orthogonal views of the toboggan cluster. Axial view $26_{11}$ shows an axial plane view of the toboggan cluster that includes an XZ toboggan cluster view $36_4$ and a XZ expanded cluster view $56_2$. A cross-hair 28 is positioned to indicate the polyp's presence and location in the sub-volume. Axial view $30_{11}$ shows an axial plane view of the toboggan cluster that includes a XY toboggan cluster view $38_4$ and a XY expanded cluster view $58_2$. Axial view $32_{11}$ shows an axial plane view of the toboggan cluster that includes a YZ toboggan cluster view $40_4$ and a YZ expanded cluster view $60_2$.

FIG. 15 shows the formed cluster after the integration process for clusters is performed in an exemplary embodiment of the invention. In FIG. 15, the formed toboggan cluster is represented as small circles in an Axial views window $24_{12}$. The Axial views window $24_{12}$ shows orthogonal views of the formed toboggan cluster. Axial view $26_{12}$ shows an axial plane view of the formed toboggan cluster that includes an XZ toboggan cluster view $36_5$. A cross-hair 28 is positioned to indicate the polyp's presence and location in the sub-volume. Axial view $30_{12}$ shows an axial plane view of the formed toboggan cluster that includes a XY toboggan cluster view $38_5$. Axial view $32_{11}$ shows an axial plane view of the formed toboggan cluster that includes a YZ toboggan cluster view $40_5$.

Figure 16:
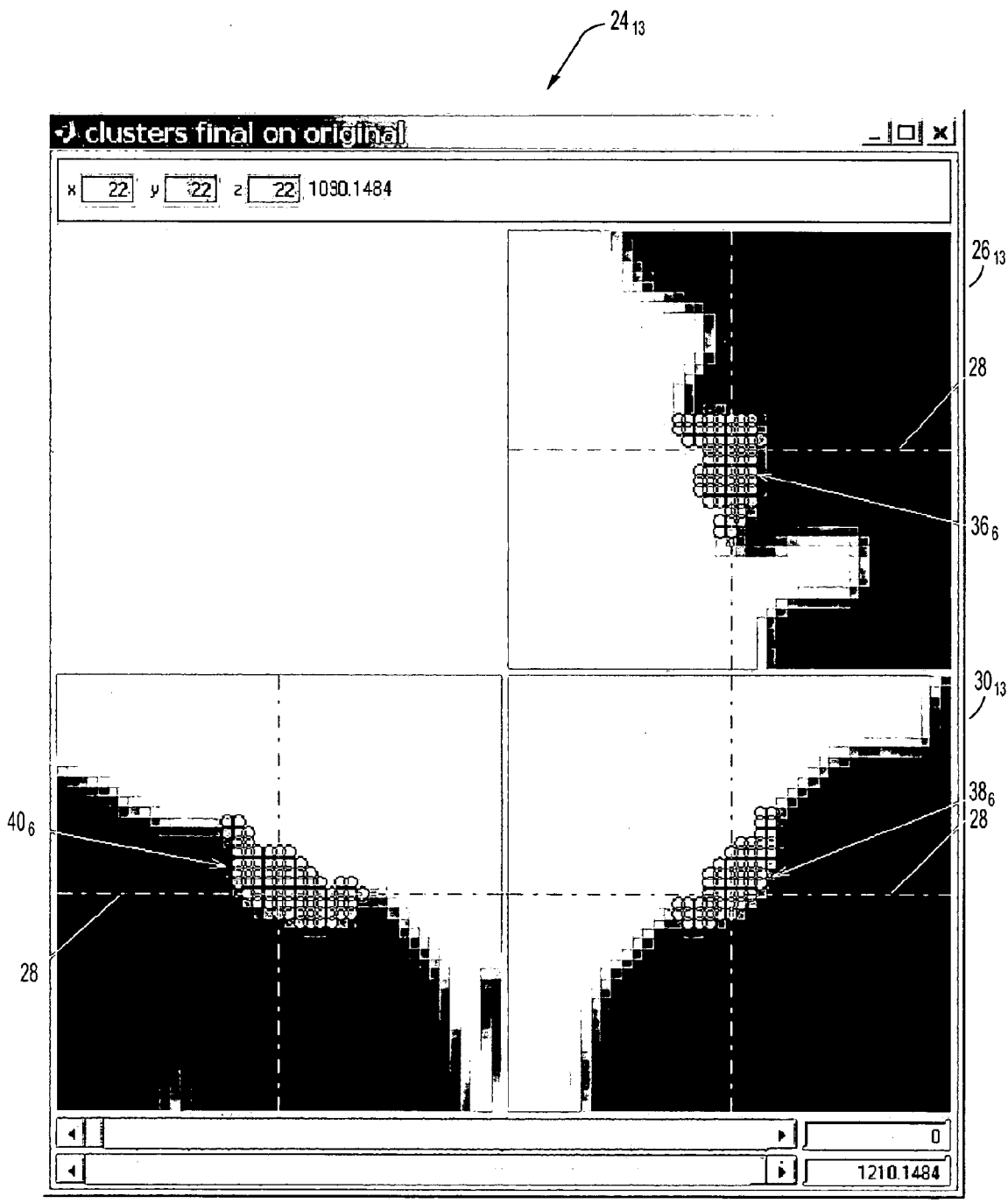
FIG. 16 shows the final toboggan cluster obtained after performing morphological operations in an exemplary embodiment of the invention.

FIG. 16 shows the final toboggan cluster obtained after performing morphological operations in an exemplary embodiment of the invention. In FIG. 16, the final toboggan cluster is represented as small circles in an Axial views window $24_{13}$. The Axial views window $24_{13}$ shows orthogonal views of the final toboggan cluster. Axial view $26_{13}$ shows an axial plane view of the final toboggan cluster that includes an XZ toboggan cluster view $36_6$. A cross-hair 28 is positioned to indicate the polyp's presence and location in the sub-volume. Axial view $30_{13}$ shows an axial plane view of the final toboggan cluster that includes a XY toboggan cluster view $38_6$. Axial view $32_{11}$ shows an axial plane view of the final toboggan cluster that includes a YZ toboggan cluster view $40_6$.

Morphological operations are described next. The resulting cluster, from the above process, might not fully account for the polyp surface, therefore, morphological operations (e.g. dilation, closing, etc.) are applied to complete the final toboggan cluster as a polyp segmentation. Since the focus is on including voxels which form the polyp surface, the dilation process is applied when the dilation mask contains more than n1 voxels in the air and more than n2 voxels in the cluster. By requiring that a portion of the dilation mask contain a percentage of voxel in the air, the dilation is confined to the portion of the cluster which extents toward the lumen (air) within the colon. In the illustrated example, n1=12 and n2=3, the final toboggan cluster is given in FIG. 15.

The integration of the clusters across the various mask may yield a resulting cluster that includes small holes. This is due to the way clusters are extracted and limited in growth, based on the DGFR responses with the various masks. To fill in these gaps and also smoothen its outer shape, morphological closing is applied on the resulting cluster. In the illustrated example, no gaps occurred and no additional voxels were included through morphological closing. The toboggan cluster in FIG. 16 provided the final polyp segmentation.

The final segmented image can be further refined with a comparison of the segmented candidate (a polyp in the present example) with known classes of model shapes for refining the initial segmentation. This will ensure that the final segmented candidate is consistent with known prototypical topologies of candidates. In medical images such prototypical candidates can be tumors, polyps, nodules, etc.

Figure 17:
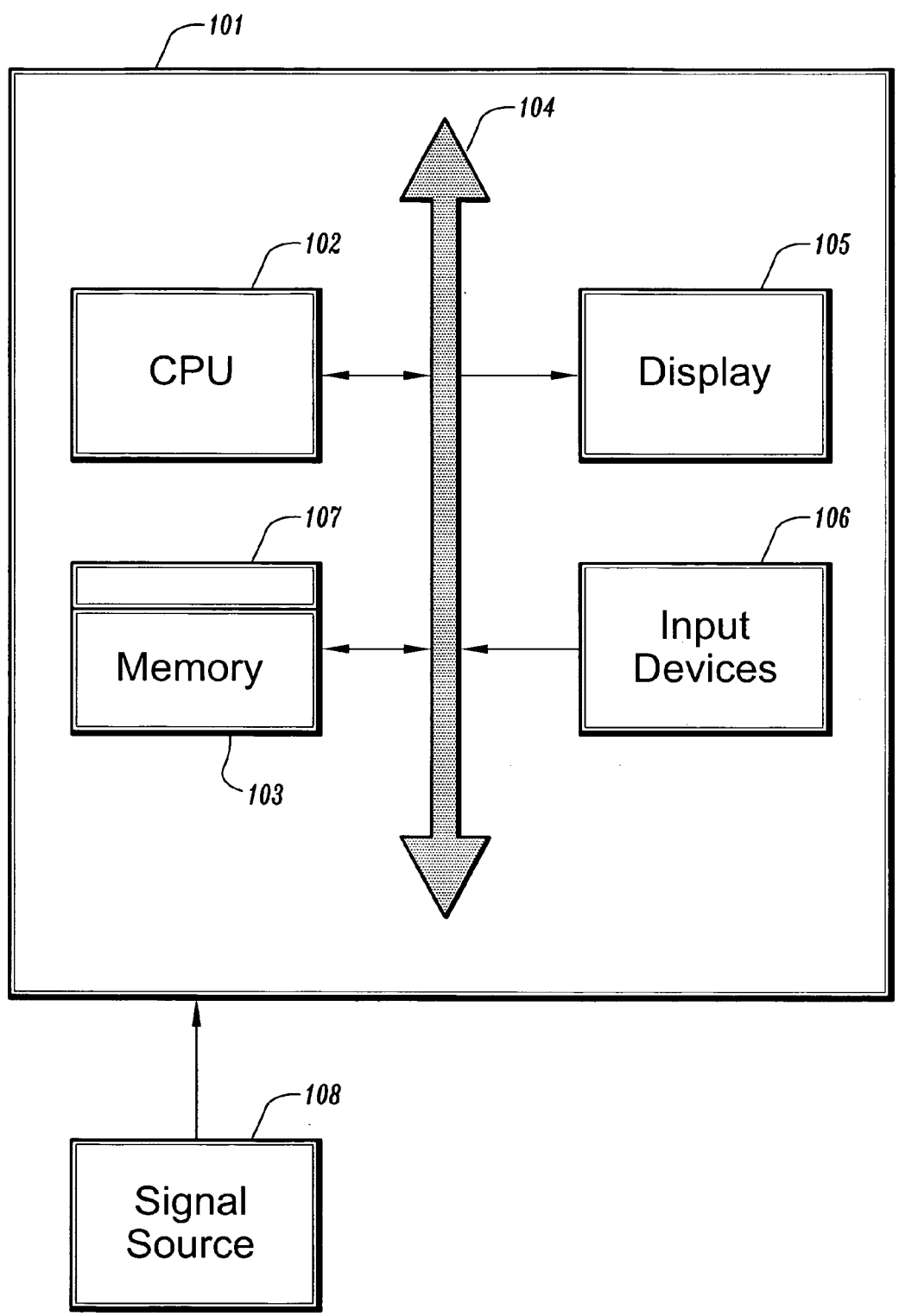
FIG. 17 shows an exemplary computer used in an exemplary embodiment of the present invention.

Referring to FIG. 17, according to an exemplary embodiment of the present invention, a computer system 101 for implementing the invention can comprise, inter alia, a central processing unit (CPU) 102, a memory 103 and an input/ output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. An exemplary embodiment of the invention can be implemented as a routine 107 that is stored in memory 103 and executed by the CPU 102 to process the signal from the signal source 108. As such, the computer system 101 is a general purpose computer system that becomes a specific purpose computer system when executing the routine 107 of the present invention in an exemplary embodiment of the invention.

The computer platform 101 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed in an exemplary embodiment of the invention. Given the teachings of the present invention provided herein, one of ordinary skill in the related art will be able to contemplate these and similar implementations or configurations of the present invention.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method for segmenting one or more candidates in an image having image elements, the method comprising:
    using a computer system to perform the steps of:
    identifying a location for one of the candidates in the image, wherein the location is based at a given one of the image elements;
    computing a plurality of response values at each of one or more neighboring image elements that are in a neighborhood of the location;
    creating a respective image element cluster of the one or more neighboring image elements from each of the computed response values; and
    integrating, selectively, the image element clusters to create a segmentation of the candidate at the identified location.

2. The method of claim 1, wherein the step of computing the plurality of response values further comprises:
    computing one or more Divergent Gradient Field (DGFR) responses from the image using one or more template masks.

3. The method of claim 2, wherein the step of creating image element clusters comprises:
    forming a base cluster from the image elements based on the DGFR responses computed for at least one first template mask; and
    refining the base cluster based on the DGFR responses computed for at least one second template mask.

4. The method of claim 3, further comprises the step of:
    computing a normalized gradient field of the image.

5. The method of claim 4, wherein the step of computing the plurality of response values further comprises the step of:
    performing a vector convolution of the normalized gradient field with one or more of the template masks.

6. The method of claim 5, wherein the template masks comprise:

$$M_x(i,j,k)=i/\sqrt{(i^2+j^2+k^2)}$$

$$M_y(i,j,k)=j/\sqrt{(i^2+j^2+k^2)}$$

$$M_z(i,j,k)=k/\sqrt{(i^2+j^2+k^2)}.$$

7. The method of claim 6, wherein the vector convolution operation comprises:

$$DGFR(x,y,z) = \sum_{k\in\Omega}\sum_{j\in\Omega}\sum_{i\in\Omega} M_x(i,j,k)I_x(x-i,y-j,z-k) + \sum_{k\in\Omega}\sum_{j\in\Omega}\sum_{i\in\Omega} M_y(i,j,k)I_y(x-i,y-j,z-k) + \sum_{k\in\Omega}\sum_{j\in\Omega}\sum_{i\in\Omega} M_z(i,j,k)I_z(x-i,y-j,z-k),$$

wherein $\Omega=[-\text{floor}(S/2), \text{floor}(s/2)]$.

8. The method of claim 2, wherein the step of creating image element clusters comprises the step of:
    tobogganing using the DGFR responses to generate one or more tobogganed clusters.

9. The method of claim 8, wherein integrating, selectively, the image element clusters further comprises the step of:
    selecting a base cluster from the tobogganed clusters that corresponds to the largest of the template masks for which at least one candidate object was detected; and
    expanding the base cluster iteratively by including the image elements that correspond to the selected tobogganed clusters obtained from such template masks that are smaller than the largest mask if the selected tobogganed clusters satisfy a predetermined inclusion threshold criteria.

10. The method of claim 8 further comprising the step of:
    segmenting the image using the last tobogganed cluster to analyze the given one of the candidate objects.

11. The method of claim 10, further comprises the step of:
    refining the segmented image by comparing the given one of the analyzed candidate objects with a predetermined candidate object prototype.

12. The method of claim 2, wherein the step of creating image clusters comprises:
    using the DGFR responses as one or more toboggan potentials for each of the image elements; and
    performing a toboggan operation over the image elements using the DGFR responses to determine a tobogganed cluster.

13. The method of claim 12, wherein the step of performing the toboggan operation further comprises:
    sliding from a given one of the image elements to a neighboring image element towards a concentration location within the image elements.

14. The method of claim 12, wherein the sliding is performed towards a concentration location having one of a minimum and a maximum value of the toboggan potentials.

15. The method of claim 12, wherein the step of performing the tobogganing operation further comprises:
    climbing from a given one of the image elements to a neighboring image element towards a concentration location within the image elements.

16. The method of claim 15, wherein the climbing is performed towards a concentration location having one of a minimum and a maximum value of the toboggan potentials.

17. The method of claim 1, wherein the image elements are at least one of voxels in a three-dimensional image and pixels in a two-dimensional image.

18. The method of claim 1, wherein the image is a medical image and at least one of the candidates is a polyp of the colon.

19. The method of claim 1, further comprising the step of:
applying one or more morphological operations to the integrated image element clusters.

20. A method for analyzing one or more candidate objects in an image volume having one or more image elements, the method comprises:
using a computer system to perform the steps of:
computing a normalized gradient field of the image volume;
computing Divergent Gradient Field (DGFR) responses from the normalized gradient field using a plurality of template masks having different scales;
tobogganing using the DGFR responses to generate a plurality of respective tobogganed clusters for the DGFR responses at the different scales; and
integrating the tobogganed clusters to determine at least one tobogganed cluster corresponding to a given one of the candidate objects as a final tobogganed cluster.

21. The method of claim 20, further comprises the steps of:
segmenting the final tobogganed cluster to analyze the given one of the candidate objects.

22. The method of claim 21, wherein a segmented result from segmenting step is refined using model classes that comprise one or more predetermined potential segmented objects.

23. The method of claim 22, wherein the model classes comprise structures segmented in medical images.

24. A computer readable medium embodying instructions executable by a processor to perform a method for segmenting one or more candidates in an image having image elements, the method steps comprise:
identifying a location for one of the candidates in the image, wherein the location is based at a given one of the image elements;
computing a plurality of response values at each of one or more neighboring image elements that are in a neighborhood of the location;
creating a respective image element cluster of the one or more neighboring image elements from each of the computed response values; and
integrating, selectively, the image element clusters to create a segmentation of the candidate at the identified location.

25. The computer readable medium of claim 24, wherein the step of computing the plurality of response values further comprises instructions for:
computing one or more Divergent Gradient Field (DGFR) responses from the image using one or more template masks.

26. The computer readable medium of claim 25, wherein the step of creating image element clusters comprises instructions for:
forming a base cluster from the image elements based on the DGFR responses computed for a first template mask; and
refining the base cluster based on the DGFR responses computed for a second template mask.

27. The computer readable medium of claim 25, further comprises instructions for:
computing a normalized gradient field of the image.

28. The computer readable medium of claim 27, wherein the step of computing the plurality of response values further comprises instructions for:
performing a vector convolution of the normalized gradient field with one or more of the template masks.

29. The computer readable medium of claim 28, wherein the template masks comprise:

$$M_x(i,j,k)=i/\sqrt{(i^2+j^2+k^2)}$$

$$M_y(i,j,k)=j/\sqrt{(i^2+j^2+k^2)}$$

$$M_z(i,j,k)=k/\sqrt{(i^2+j^2+k^2)}.$$

30. The computer readable medium of claim 29, wherein the vector convolution operation comprises instructions for:

$$DGFR(x, y, z) = \sum_{k\in\Omega}\sum_{j\in\Omega}\sum_{i\in\Omega} M_x(i, j, k)I_x(x - i, y - j, z - k) +$$
$$\sum_{k\in\Omega}\sum_{j\in\Omega}\sum_{i\in\Omega} M_y(i, j, k)I_y(x - i, y - j, z - k) +$$
$$\sum_{k\in\Omega}\sum_{j\in\Omega}\sum_{i\in\Omega} M_z(i, j, k)I_z(x - i, y - j, z - k), \text{ wherein}$$

$$\Omega = [-\text{floor}(S/2), \text{floor}(S/2)].$$

31. The computer readable medium of claim 25, wherein the step of creating image clusters comprises instructions for:
using the DGFR responses as toboggan potentials for each of the image elements; and
performing a toboggan operation over the image elements to determine the tobogganed cluster.

32. The computer readable medium of claim 31, wherein the step of performing the toboggan operation further comprises:
sliding from a given one of the image element to a neighboring image element towards a concentration location within the image elements.

33. The computer readable medium of claim 32, wherein the sliding is performed towards a concentration location having one of a minimum and a maximum value of the toboggan potentials.

34. The computer readable medium of claim 31, wherein the step of performing the tobogganing operation further comprises instructions for:
climbing from a given one of the image element to a neighboring image element towards a concentration location within the image elements.

35. The computer readable medium of claim 34, wherein the climbing is performed towards a concentration location having one of a minimum and a maximum value of the toboggan potentials.

36. The computer readable medium of claim 24, wherein the image elements are at least one of voxels in a three-dimensional image and pixels in a two-dimensional image.

37. The computer readable medium of claim 24, wherein the image is a medical image and at least one of the candidates is a polyp of the colon.

* * * * *